United States Patent
Ardiri

(10) Patent No.: US 7,937,656 B2
(45) Date of Patent: May 3, 2011

(54) METHOD FOR RENDERING INFORMATION ON A DISPLAY

(75) Inventor: Aaron Ardiri, Stockholm (SE)

(73) Assignee: Medhand International AB, Stockholm (SE)

( * ) Notice: Subject to any disclaimer, the term of this patent is extended or adjusted under 35 U.S.C. 154(b) by 942 days.

(21) Appl. No.: 11/815,483

(22) PCT Filed: Jun. 29, 2006

(86) PCT No.: PCT/US2006/025989
§ 371 (c)(1),
(2), (4) Date: Aug. 3, 2007

(87) PCT Pub. No.: WO2007/030192
PCT Pub. Date: Mar. 15, 2007

(65) Prior Publication Data
US 2008/0209312 A1    Aug. 28, 2008

Related U.S. Application Data

(60) Provisional application No. 60/714,992, filed on Sep. 8, 2005.

(51) Int. Cl.
*G06F 17/00* (2006.01)

(52) U.S. Cl. ........ 715/256; 715/234; 715/236; 715/239; 715/243

(58) Field of Classification Search ............... 715/234, 715/236–239, 243, 255–256
See application file for complete search history.

(56) References Cited

U.S. PATENT DOCUMENTS

| | | | |
|---|---|---|---|
| 6,638,089 B2 * | 10/2003 | Fukumoto et al. | 439/267 |
| 6,638,317 B2 * | 10/2003 | Nakao | 715/255 |
| 6,809,738 B2 | 10/2004 | Hubrecht | |
| 6,857,102 B1 * | 2/2005 | Bickmore et al. | 715/205 |
| 7,308,649 B2 * | 12/2007 | Ehrich et al. | 715/234 |
| 7,325,189 B2 * | 1/2008 | Kurumai et al. | 715/234 |
| 7,636,891 B2 * | 12/2009 | Yuan et al. | 715/744 |

* cited by examiner

*Primary Examiner* — Thu Huynh
(74) *Attorney, Agent, or Firm* — Fasth Law Offices; Rolf Fasth

(57) ABSTRACT

The method is for rendering information on a display. Content components in a container are provided. A content handler (style sheet) is used to transform the content components. A key word in the content component is identified. A real time link is provided between the key word and an outside source. A screen size of a display unit is determined. A size of a first display is adjusted by only displaying a complete content of a first level of the content components and a link to a second level. The link is activated to display a complete content of the second level and a link to the second level.

9 Claims, 2 Drawing Sheets

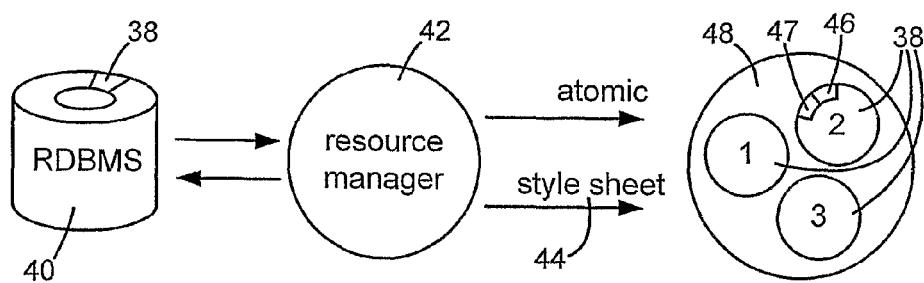
FIG. 3
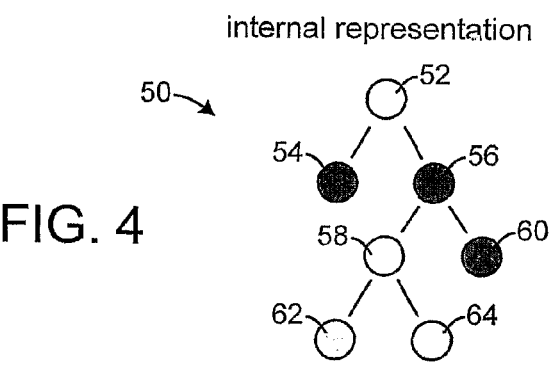
FIG. 4
FIG. 5A
on-screen rendering/placement
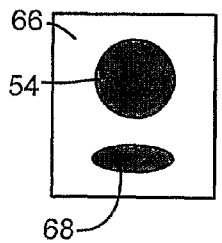
FIG. 5B
on-screen rendering/placement
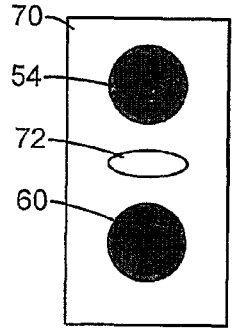
FIG. 5C
on-screen rendering/placement
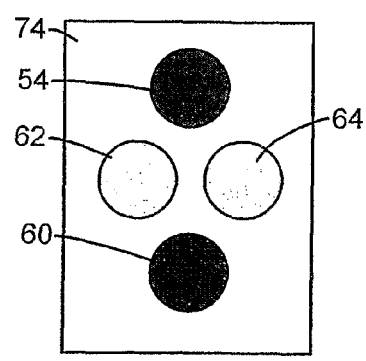

METHOD FOR RENDERING INFORMATION ON A DISPLAY

PRIOR APPLICATION

This application is a U.S. national phase application based on International Application No. PCT/US2006/025989, filed 29 Jun. 2006, claiming priority from U.S. Provisional Patent Application No. 60/714,992, filed 8 Sep. 2005.

TECHNICAL FIELD

The method of the present invention relates to the rendering of information on a computerized display. In particular, the method relates to the transformation of information into a hierarchic format and using content handlers/logic to provide the highest quality presentation regardless of resolution.

BACKGROUND OF INVENTION

Attempts have been made to improve the handling and presentation of complex information on displays. However, the currently available methods and systems fail to provide a satisfactory presentation over a wide range of resolutions, especially low resolution devices such as handheld digital assistants and mobile phones.

Current methods and systems either build separate information sets for each resolution group or tend to render using generic methods which work well with high resolutions but on lower resolutions the quality of information presented is degraded. In some cases, restructuring the content has improved quality however it requires substantial scrolling and the information may be harder to locate and identify.

There is a need for a reliable and effective way of integrating and presenting information on a diverse range of resolutions and maintain the highest quality presentation.

SUMMARY OF INVENTION

The present invention provides a solution to the above outlined problems. More particularly, the information is translated into a hierarchic format for presentation. The display screen size is determined and in conjunction with a content handler so that the best presentation is determined.

BRIEF DESCRIPTION OF DRAWINGS

FIG. 3 is a schematic view of the data storage and extraction process for presentation using a content handler (labeled style sheet);

FIG. 4 is a schematic illustration of an internal hierarchic representation of information;

FIG. 5A is a display on a small screen;

FIG. 5B is a display on a medium sized screen; and

FIG. 5C is a display on a large screen.

DETAILED DESCRIPTION

Figure 1:
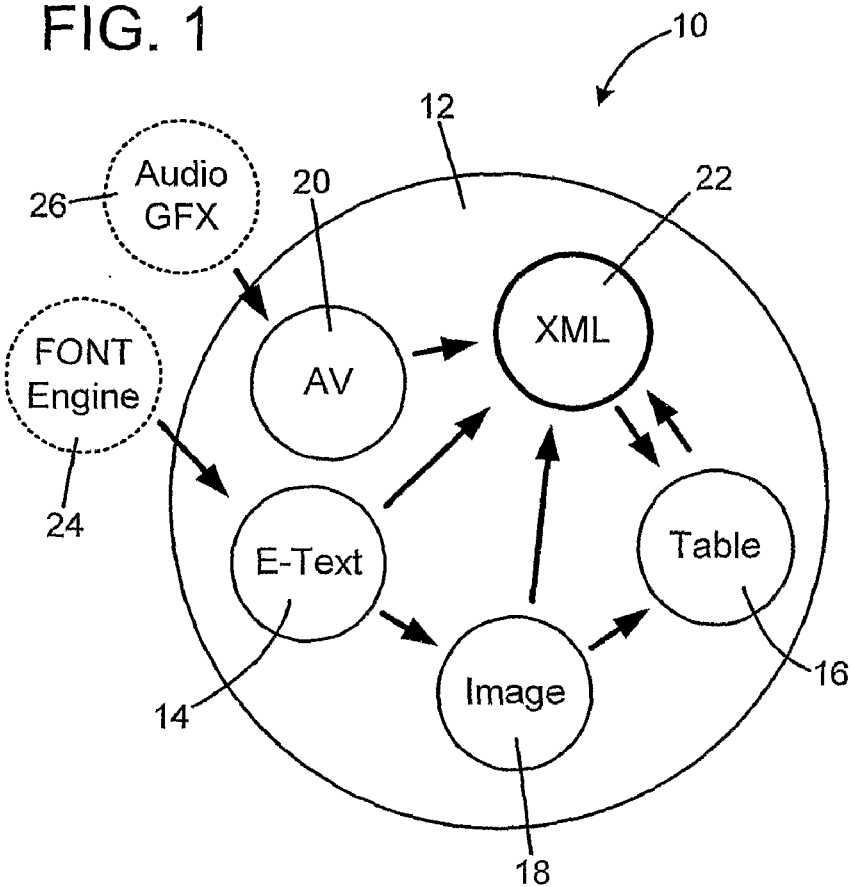
FIG. 1 is a schematic overview of the information formats that can be rendered and their integration relationship to each other.

FIG. 1 shows the system of the present invention is capable of handling all known information formats and this can be done in a platform independent manner 10. The method can handle and present content components types 12 in a wide variety of forms such as enhanced text 14, tables 16, images 18, and audiovisual clips 20 that are stored by reference in an XML format 22 to make the contents useful for any presentation environment. Tables 16 can be nested within each other and can contain images 18 which can have enhanced text 14 overlaid on top of them. The invention has two external dependencies, enhanced text 14 requires a font engine 24 and the audiovisual clip feature 20 requires an audio and graphics layer 26. This definition supports the complete range of information to be presented on a computerized display.

Figure 2:
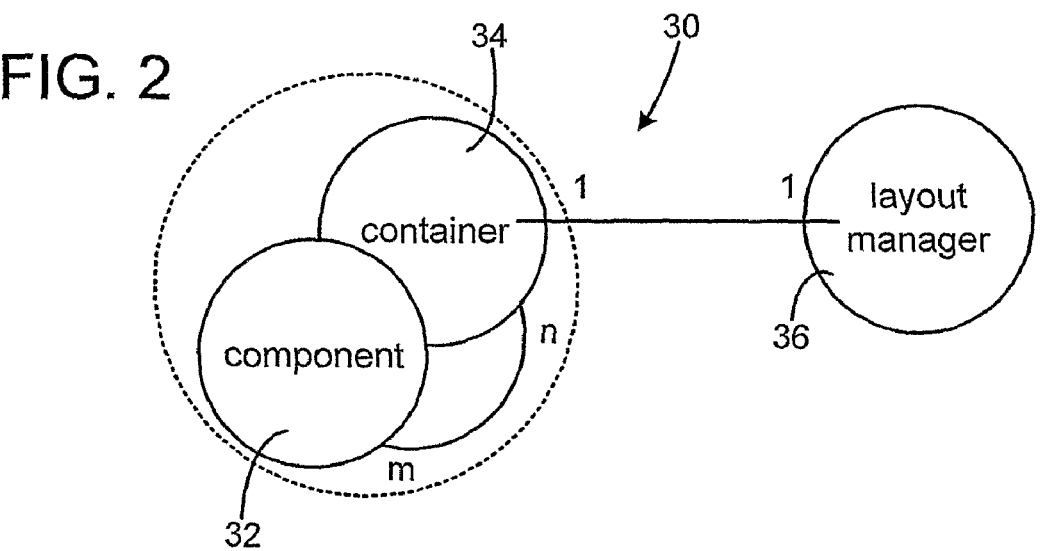
FIG. 2 is a schematic view of a basic design of an atomic object in the system, demonstrating how a component can be a container of components.

FIG. 2 is a schematic view of an atomic object 30. The design 30 has a component 32 which may represent an enhanced text 14, image 16 and audiovisual clip 20. A container 34 is a component 32 that can hold more multiple components such as tables 16 and the XML structure 22—combined with a layout manager 36 they tell the system how to order and present the information. For example, the layout manager 36 may determine the order and layout of the components within a container.

FIG. 3 is a schematic view that illustrates the relationship between data storage and the internal representation for presentation. Information such as contents 38 are loaded from a database 40 via a resource manager 42. An appropriate content handler (style sheet) 44 is then applied to transform the downloaded atomic objects 38 in a customized format. The content handler or style sheet 44 has at least two functions. The style sheet describes how to handle the contents of the atomic objects 38 and how to merge the contents when displayed. The content handler or style sheet has additional functionality that allows the cross reference between all the data contents. For example, the style sheet may be linked to global and reference books. If, for example, a page of information is viewed, the text of the database may include a key word 46 that has been identified as special.

In real time, the style sheet may look for the key word 46 in a dictionary. If the key word is found in the dictionary, the style sheet will put a link 47 inside the text of the content 38. The user may then click on the link 47 to obtain the dictionary definition of the keyword inside the page or as a pop-up window. The style sheet permits the linking to multiple contents from different sources in real time and simultaneously shows the information collectively on the display 48 so that text and definitions from outside sources are embedded in the data text. If, for example, one of the outside sources is changed, such as the dictionary, there is no need to change the other contents on the display.

The style sheet 44 may be used to reorganize the content on the display. Meta tags have been added to the data to allow multiple contents to be displayed in real time since the same source format is used from the suppliers of the contents. In this way, dictionary definitions and other cross reference information from different sources can be displayed or embedded in real time so there is no need to open/visit additional presentation views.

FIG. 4 shows a hierarchy of an internal representation 50 that may have a first level 52 and second levels 54, 56. The levels may represent paragraphs of information. The second level 56 may be a category that combines the third levels 58, 60. The third level 58 may be a category that combines the fourth levels 62, 64. FIGS. 5A, 5B, 5C show three different screen sizes. FIG. 5A may show a typical screen size 66 for a mobile phone, FIG. 5B may illustrate a typical screen size 70 for a handheld PDA computer and FIG. 5C may illustrate a typical screen size 74 for a conventional desktop or laptop monitor. On the small screen 66, the whole content of the second level 54 is shown with a link 68 to the second level 56 because nothing more fits on the screen 66. By clicking on the link 68, the third levels 58 and 60 are displayed. On the medium sized screen 70, the whole content of the second level 54 is shown. The whole content of the third level 60 is also shown and a link 72 to the third level 58. By clicking on the link 72, the fourth levels 62, 64 are shown. On the large screen 74 all the content is shown including the whole content of the second level 54, the whole content of the third level 58 which includes the content of the fourth levels 62, 64 and the whole content of the third level 60. The content handler or style sheet may also force expansion of information modes to improve clarity of the information provided which is provider dependent. This display method makes it possible to display the same data differently depending upon the size of the screen so that the same data may be transferred between different display devices without requiring any special reformatting and different versions for different resolutions.

While the present invention has been described in accordance with preferred compositions and embodiments, it is to be understood that certain substitutions and alterations may be made thereto without departing from the spirit and scope of the following claims.

The invention claimed is:

1. A method for rendering information on a display, comprising:
   providing text information in a container;
   using a style sheet for transforming the text information into a hierarchic format having a first level paragraph, second level paragraphs, third level paragraphs and fourth level paragraphs;
   identifying a key word in the text information;
   the style sheet searching for the key word in an outside source;
   when the key word is found in the outside source, providing a real time link between the key word and the outside source;
   determining the first level paragraph being a combination of the second level paragraphs;
   determining the second level paragraphs having no third level paragraphs;
   determining the second level paragraphs being a combination of third level paragraphs;
   determining the third level paragraphs being a combination of fourth level paragraphs;
   determining the third level paragraphs having no fourth level of paragraphs;
   adjusting a size of a first display by only displaying a complete content of the second level paragraphs that is a combination of no third level paragraphs;
   displaying a link to the second level paragraphs that is a combination of the third level of paragraphs;
   transferring the text information to a second display being larger than the first display; and
   without formatting, the second display displaying the complete content of the second level paragraphs and a link to the third level paragraphs that is a combination of the fourth level paragraphs and a complete content of the third level paragraphs that is a combination of no fourth level paragraphs.

2. The method according to claim 1 wherein the method further comprises activating the link to the second level paragraphs to display a third level paragraph and a link to a third level.

3. The method according to claim 2 wherein the method further comprises activating the link to the third level paragraphs to display a fourth level paragraphs.

4. The method according to claim 1 wherein the method further comprises the second display automatically displaying the complete content of the second level paragraphs and a complete content of the third level paragraphs and the link to the third level paragraphs to display the fourth level paragraphs.

5. The method according to claim 4 wherein the method further comprises displaying enhanced text.

6. The method according to claim 1 wherein the method further comprises associating a layout manager with the container.

7. The method according to claim 1 wherein the method further comprises activating the link to obtain information about the key word.

8. The method according to claim 1 wherein the method further comprises the style sheet permitting links to multiple outside sources in real time.

9. The method according to claim 8 wherein the method further comprising using the style sheet to reorganize content components on a display.

* * * * *